(12) United States Patent
Yang et al.

(10) Patent No.: US 9,071,084 B2
(45) Date of Patent: Jun. 30, 2015

(54) NEUTRAL POINT CLAMPED CONVERTER CONTROL SYSTEMS AND METHODS

(71) Applicant: GENERAL ELECTRIC COMPANY, Schenectady, NY (US)

(72) Inventors: Wenqiang Yang, Shanghai (CN); Anthony Michael Klodowski, Roanoke, VA (US); Robert Allen Seymour, Hardy, VA (US)

(73) Assignee: General Electric Company, Schenectady, NY (US)

( * ) Notice: Subject to any disclaimer, the term of this patent is extended or adjusted under 35 U.S.C. 154(b) by 385 days.

(21) Appl. No.: 13/682,938

(22) Filed: Nov. 21, 2012

(65) Prior Publication Data

US 2013/0128631 A1    May 23, 2013

(30) Foreign Application Priority Data

Nov. 22, 2011    (CN) .......................... 2011 1 0373956

(51) Int. Cl.
*H02M 5/458*    (2006.01)
*H02J 3/36*    (2006.01)
*H02M 7/487*    (2007.01)

(52) U.S. Cl.
CPC . *H02J 3/36* (2013.01); *H02M 7/487* (2013.01)

(58) Field of Classification Search
USPC .................. 363/34, 35, 37, 78, 84, 89, 95, 98
See application file for complete search history.

(56) References Cited

U.S. PATENT DOCUMENTS

| | | | |
|---|---|---|---|
| 6,031,738 A * | 2/2000 | Lipo et al. ........................ | 363/37 |
| 6,459,596 B1 | 10/2002 | Corzine | |
| 6,534,949 B2 | 3/2003 | Szczesny et al. | |
| 7,164,254 B2 * | 1/2007 | Kerkman et al. ............. | 318/812 |
| 7,230,837 B1 | 6/2007 | Huang et al. | |

(Continued)

FOREIGN PATENT DOCUMENTS

| WO | 2010023284 A1 | 3/2010 |
|---|---|---|
| WO | 2010049412 A1 | 5/2010 |

OTHER PUBLICATIONS

Marchesoni et al., "Voltages Balancing in Neutral-Point-Clamped Active Rectifiers based on Current Harmonic Distortion".

(Continued)

*Primary Examiner* — Jeffrey Sterrett
(74) *Attorney, Agent, or Firm* — Global Patent Operation; Douglas D. Zhang

(57) ABSTRACT

A control system includes first and second fundamental control units for generating first and second fundamental commands, and a compensation control unit. The compensation control unit includes first and second calculation elements and a comparator for comparing first and second modulation indexes. When the first modulation index is less than the second modulation index, the first calculation element generates a first source-side compensation command. When the first source-side compensation command is not sufficient to balance the neutral point voltage, the first calculation element further generates a first line-side compensating command. When the first modulation index is greater than the second modulation index, the second calculation element generates a second line-side compensation command. When the second line-side compensation command is not sufficient to balance the neutral point voltage, the second calculation element further generates a second source-side compensating command.

20 Claims, 8 Drawing Sheets

(56) References Cited

U.S. PATENT DOCUMENTS

| | | | |
|---|---|---|---|
| 7,274,576 B1* | 9/2007 | Zargari et al. | 363/39 |
| 7,495,938 B2 | 2/2009 | Wu et al. | |
| 7,573,732 B2* | 8/2009 | Teichmann et al. | 363/51 |
| 2006/0067092 A1* | 3/2006 | Nondahl et al. | 363/37 |
| 2011/0007531 A1* | 1/2011 | Sakakibara | 363/37 |
| 2011/0057444 A1 | 3/2011 | Dai et al. | |
| 2011/0127837 A1* | 6/2011 | Sato et al. | 307/66 |
| 2013/0128631 A1* | 5/2013 | Yang et al. | 363/35 |
| 2013/0128632 A1* | 5/2013 | Yang et al. | 363/37 |
| 2013/0163292 A1* | 6/2013 | Basic et al. | 363/34 |
| 2013/0169035 A1* | 7/2013 | Nakashima | 307/9.1 |
| 2014/0226373 A1* | 8/2014 | Park et al. | 363/35 |

OTHER PUBLICATIONS

Ma et al., "A Simple Control Strategy for Balancing the DC-Link Voltage of Neutral-Point-Clamped Inverter at Low Modulation Index", 29th Annual Conference of the IEEE Industrial Electronics Society (IECON 2003), vol. 3, pp. 2167, Nov. 2-6, 2003.

Krishna et al., "Space Vector Modulation Method to Balance the Neutral Voltage for a Three Level Inverter", 2010 Joint International Conference on Power Electronics, Drives and Energy Systems (PEDES) & 2010 Power India, pp. 1-6, Dec. 20-23, 2010, New Delhi.

Marchesoni: "A new control Strategy for Neutral-Point-Clamped Active Rectifiers"—IEEE Transactions on industrial electronics vol. 52 No. 2 Apr. 2005.

\* cited by examiner

NEUTRAL POINT CLAMPED CONVERTER CONTROL SYSTEMS AND METHODS

BACKGROUND

The described embodiments relate generally to neutral point clamped (NPC) converter control systems and methods for balancing neutral point (mid-point) voltage. This type of voltage balancing is especially useful in renewable power generation systems such as wind and photovoltaic power generation systems, for example.

Neutral point clamped (NPC) converters are widely applied in power conversion systems. One challenge for a NPC converter topology is neutral point voltage imbalance. For optimal operation of a typical NPC converter, such as a three-level converter, the neutral point voltage imbalance should be maintained at about zero volts. Typically, a pulse width modulation (PWM) control strategy can be used to balance (center) the neutral point voltage.

For PWM balance control strategies, the basic principle is to inject an additional compensation command during PWM modulation. By this technique, the neutral point current is regulated to charge or discharge a capacitor bank to compensate for any capacitor voltage imbalance (neutral point voltage imbalance). A conventional power conversion system may include a source-side converter and a line side converter. In conventional methods, the additional compensation command is sent to only one of the source-side converter and the line side converter.

However, single side control strategies may not always be sufficient to balance a relative larger neutral point voltage imbalance of a power conversion system. In such situations, as can be seen with reference to the example graph of FIG. 1, a voltage trend curve A1 of an upper capacitor and a voltage trend curve B1 of a lower capacitor may increasingly diverge over time.

Therefore, it is desirable to provide a NPC converter control system and method to improve performance of balancing neutral point voltage.

BRIEF DESCRIPTION

In accordance with one embodiment disclosed herein, a control system for providing commands to a source-side converter and a line-side converter of a power conversion system for balancing a neutral point voltage on a DC link between the source-side converter and the line-side converter is provided. The control system includes a first fundamental control unit, a second fundamental control unit, and a compensation control unit. The first fundamental control unit generates a first fundamental command to implement fundamental power conversion operation for the source-side converter. The second fundamental control unit generates a second fundamental command to implement fundamental power conversion operation for the line-side converter. The compensation control unit includes a comparator, a first calculation element, and a second calculation element. The comparator compares a first modulation index of the source-side converter and a second modulation index of the line-side converter. The first calculation element is used for, when the first modulation index is less than the second modulation index, receiving a fundamental compensation command and generating a first source-side compensation command for injection into the first fundamental command and, when the first source-side compensation command is not sufficient to balance the neutral point voltage, further generating a first line-side compensating command for injection into the second fundamental command. The second calculation element is used for, when the first modulation index is greater than the second modulation index, receiving the fundamental compensation command and generating a second line-side compensation command for injection into the second fundamental command and, when the second line-side compensation command is not sufficient to balance the neutral point voltage, further generating a second source-side compensating command for injection into the first fundamental command.

In accordance with another embodiment disclosed herein, a control method for balancing neutral point voltage between a source-side converter and a line-side converter of a power conversion system is provided. The control method includes generating a first fundamental command to implement fundamental power conversion operation for the source-side converter; generating a second fundamental command to implement fundamental power conversion operation for the line-side converter; obtaining a first modulation index of the source-side converter and a second modulation index of the line-side converter; determining whether the first modulation index is less than the second modulation index; when the first modulation index is less than the second modulation index, generating a first source-side compensation command for injection into the first fundamental command and, when the first source-side compensation command is not sufficient to balance the neutral point voltage, further generating a first line-side compensating command for injection into the second fundamental command; and when the first modulation index is greater than the second modulation index, generating a second line-side compensation command for injection into the second fundamental command and, when the second line-side compensation command is not sufficient to balance the neutral point voltage, further generating a second source-side compensating command for injection into the first fundamental command.

In accordance with yet another embodiment disclosed herein, a power conversion system is provided. The power conversion system includes a source-side converter, a line-side converter, a DC link coupling the source-side and line-side converters, and a control system. The control system provides commands to the source-side and line-side converters for balancing a neutral point voltage at the DC link. The control system includes a first fundamental control unit, a second fundamental control unit, and a compensation control unit. The first fundamental control unit generates a first fundamental command to implement fundamental power conversion operation for the source-side converter. The second fundamental control unit generates a second fundamental command to implement fundamental power conversion operation for the line-side converter. The compensation control unit includes a switch element and a comparator. The switch element receives a fundamental compensation command used to balance the neutral point voltage. The comparator compares a first modulation index of the source-side converter and a second modulation index of the line-side converter and controls the switch element to provide the fundamental compensation command for injection into at least the first fundamental command to balance the neutral point voltage if the first modulation index is less than the second modulation index and for controls the switch element to provide the fundamental compensation command for injection into at least the second fundamental command to balance the neutral point voltage if the first modulation index is greater than the second modulation index.

DRAWINGS

These and other features, aspects, and advantages of the present invention will become better understood when the following detailed description is read with reference to the accompanying drawings in which like characters represent like parts throughout the drawings, wherein.

DETAILED DESCRIPTION

Figure 1:
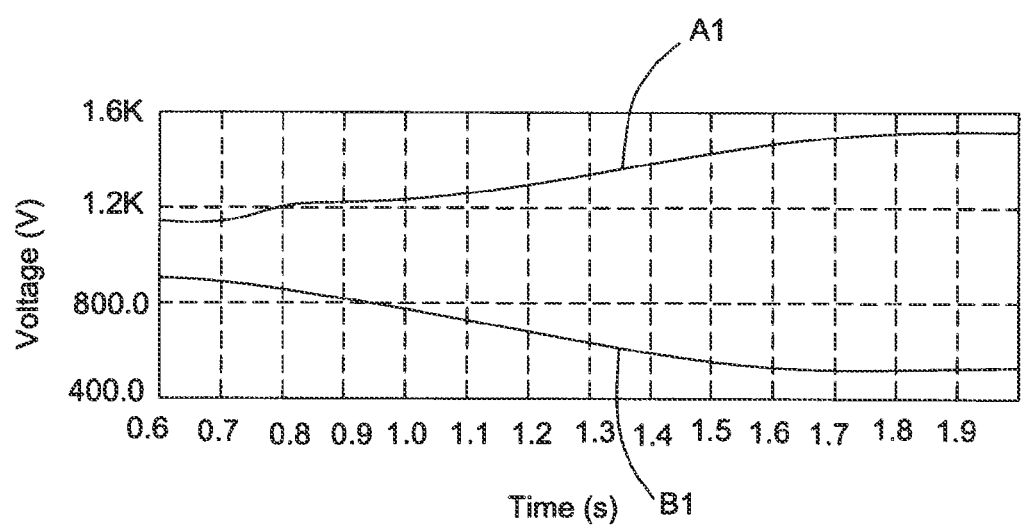
FIG. 1 is a diagram of voltage trends on upper and lower capacitors of a conventional power conversion system.

Embodiments disclosed herein relate generally to power conversion systems with improved neutral point voltage balancing capabilities. As used herein, "modulation index surplus value" refers to a compensation capability of a converter (source-side converter or line-side converter) by using a pulse width modulation (PWM) control strategy to balance neutral point voltage. If the maximum value of the modulation index is $MI_{max}$ (such as $MI_{max}=1$), and the modulation index for fundamental control without balancing neutral point voltage is MI (MI_source or MI_line), then the corresponding modulation index surplus value $MI_{sp}$ (positive value) is equal to $MI_{max}-MI$.

More particularly, the embodiments of the improved neutral point voltage balance capability described herein are based on neutral point clamped (NPC) converter control systems and methods which can inject additional compensation commands to the source-side converter and the line-side converter at the same time and which can achieve a better performance when balancing the neutral point voltage of the power conversion system.

One or more specific embodiments of the present disclosure will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

Unless defined otherwise, technical and scientific terms used herein have the same meaning as is commonly understood by one of ordinary skill in the art to which this disclosure belongs. The terms "first", "second", and the like, as used herein do not denote any order, quantity, or importance, but rather are used to distinguish one element from another. Also, the terms "a" and "an" do not denote a limitation of quantity, but rather denote the presence of at least one of the referenced items. The term "or" is meant to be inclusive and mean any one, some, or all of the listed items. The use of "including," "comprising" or "having" and variations thereof herein are meant to encompass the items listed thereafter and equivalents thereof as well as additional items. The terms "connected" and "coupled" are not restricted to physical or mechanical connections or couplings, and can include electrical connections or couplings, whether direct or indirect. Furthermore, the terms "circuit" and "circuitry" and "controller" may include either a single component or a plurality of components, which are either active and/or reactive and are connected or otherwise coupled together (e.g., as one or more integrated circuit chips) to provide the described function.

Figure 2:
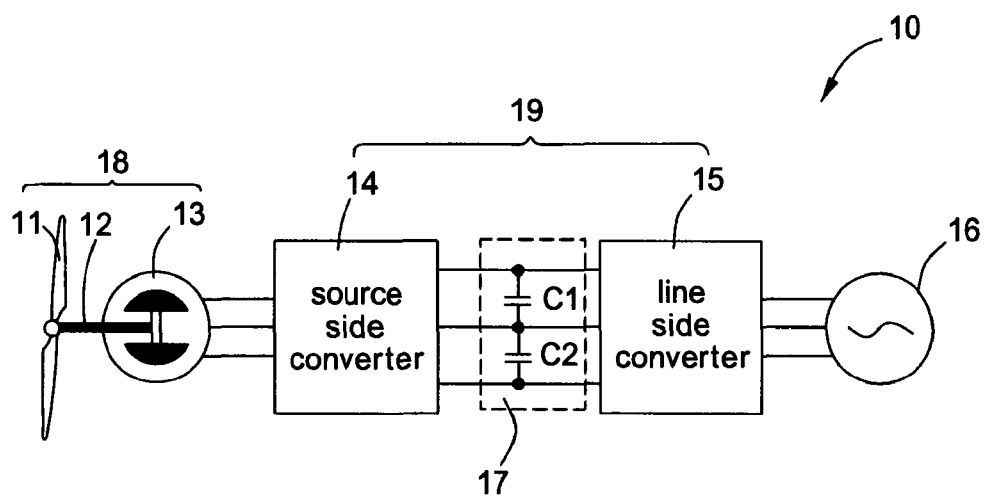
FIG. 2 is a diagram of a power conversion system in accordance with one embodiment.

FIG. 2 shows a diagram of a power conversion system 10 in accordance with one embodiment. The power conversion system 10 illustrates a wind turbine 18 embodiment for purposes of example. In the wind turbine 18, blades 11 are coupled to a shaft 12 which drives a generator 13, either directly or through a gearbox (not shown). The voltage resulting from the generator 13 has a variable frequency that is converted to a fixed frequency by a converter assembly 19 before being supplied to a power grid 16. The converter assembly 19 may include a source-side converter 14 and a line-side converter 15. The source-side converter 14 is electrically coupled to the generator 13 and used to convert alternating current (AC) signals from the generator 13 to direct current (DC) signals. The line-side converter 15 is electrically coupled to the power grid 16 and used to convert DC signals to AC signals for the power grid 16. A DC link 17 is provided for electrically coupling the source-side converter 14 to the line-side converter 15. In one embodiment, as shown in FIG. 2, the DC link 17 may include an upper capacitor C1 and a lower capacitor C2.

For simplicity of illustration, conventional transformer and filter elements between the converter assembly 19 and the power grid 16 are not shown in FIG. 2. Although a wind turbine generator 13 is shown for purposes of example, any type of generator may be included with these embodiments being particularly useful for renewable energy sources such as wind, solar, and hydrokinetic energy powered energy sources. Additionally, although a generator 13 is shown in FIG. 2, the embodiments disclosed herein are applicable to other types of loads such as motors in motor drives and load banks in uninterruptible power supplies (UPSs), for example.

Figure 3:
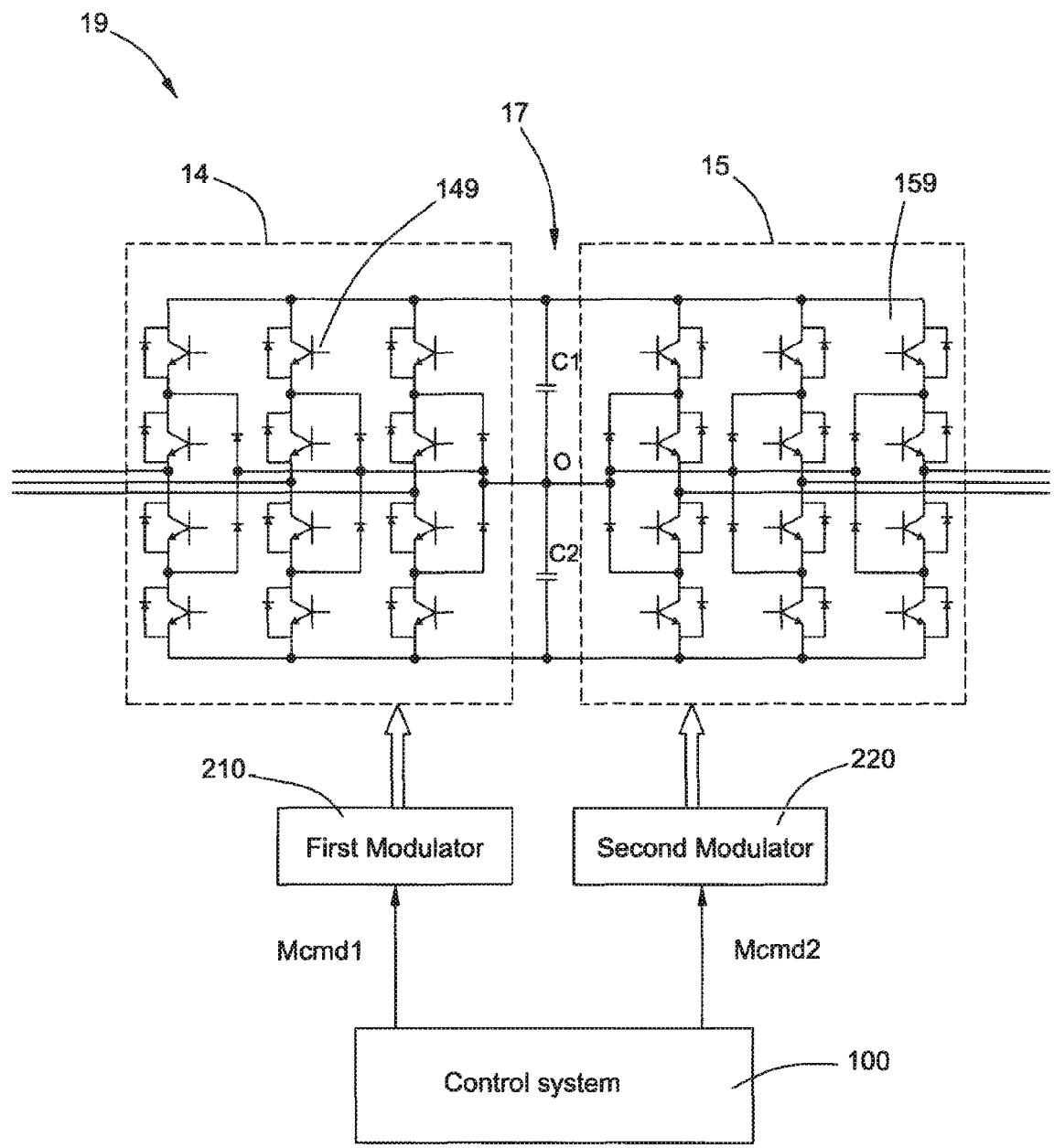
FIG. 3 is a circuit diagram of two converters of the power conversion system of FIG. 2, together with two modulators and a control system.

FIG. 3 illustrates a circuit diagram of the converter assembly 19 which is a three-level topological configuration embodiment for purposes of example. The node between the upper capacitor C1 and the lower capacitor C2 acts as a neutral point O. For optimal operation, the same magnitude of voltage should be present on each side of the neutral point O of the DC link 17 (that is, the neutral point voltage should be balanced). In the embodiment of FIG. 3, the same voltage magnitude should be present on each of the capacitor C1 and capacitor C2. In this embodiment, neutral point voltage balancing is achieved by pulse width modulation (PWM) signals on switches 149 of the source-side converter 14 or switches 159 of the line-side converter 15, or both. The PWM signals on the switches 149 of the source-side converter 14 are generated by a first modulator 210 in response to a first modulation command Mcmd1 from a control system 100, and the PWM signals on the switches 159 of the line-side converter 15 are generated by a second modulator 220 in response to a second modulation command Mcmd2 from the control system 100. The arrangement of the switches 149 and 159 of FIG. 3 is for purposes of example. In other embodiments, the arrangement of the switches 149 and 159 may be in other topological configurations, such as five-level or seven-level topological configurations, for example.

Figure 4:
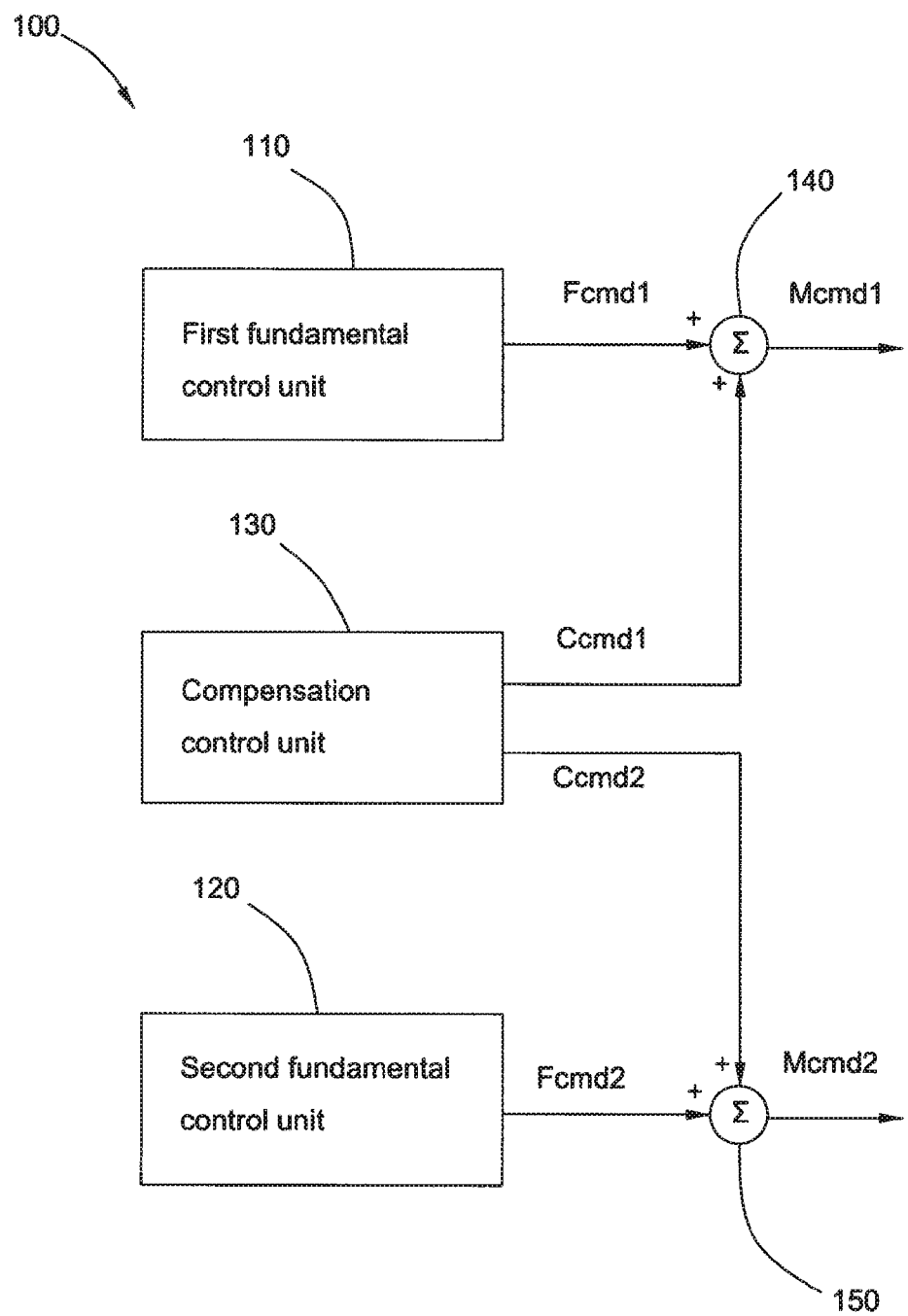
FIG. 4 is a block diagram of an example control system for use in the embodiment of FIG. 3.

Referring to FIG. 4, a block diagram of the control system 100 of FIG. 3 in accordance with an embodiment is shown. The control system 100 includes a first fundamental control unit 110, a second fundamental control unit 120, a compensation control unit 130, a first summation unit 140, and a second summation unit 150. In one embodiment, the first fundamental control unit 110, the second fundamental control unit 120, the compensation control unit 130, the first summation unit 140, and the second summation unit 150 may be situated in discrete control units and/or algorithms. In other embodiments, two or more of these units of the control system 100 may be integrated together in a common control unit and/or algorithm.

The first fundamental control unit 110 is used to generate a first fundamental command Fcmd1 to be sent to the first modulator 210 to control the source-side converter 14 to implement fundamental power conversion without necessarily balancing the neutral point voltage. The second fundamental control unit 120 is used to generate a second fundamental command Fcmd2 to be sent to the second modulator 220 to control the line-side converter 15 to implement fundamental power conversion without necessarily balancing the neutral point voltage. The compensation control unit 130 is used to generate a first compensation command Ccmd1 to be injected into the first fundamental command Fcmd1 by the first summation unit 140, to generate the first modulation command Mcmd1 to modulate the duty cycle of the PWM signal of the first modulator 210 to control the source-side converter 14 to implement fundamental power conversion while balancing the neutral point voltage. The compensation control unit 130 is also used to generate a second compensation command Ccmd2 to be injected into the second fundamental command Fcmd2 by the second summation unit 150, to generate the second modulation command Mcmd2 to modulate the duty cycle of the PWM signal of the second modulator 220 to control the line-side converter 15 to implement fundamental power conversion while balancing the neutral point voltage.

Figure 5:
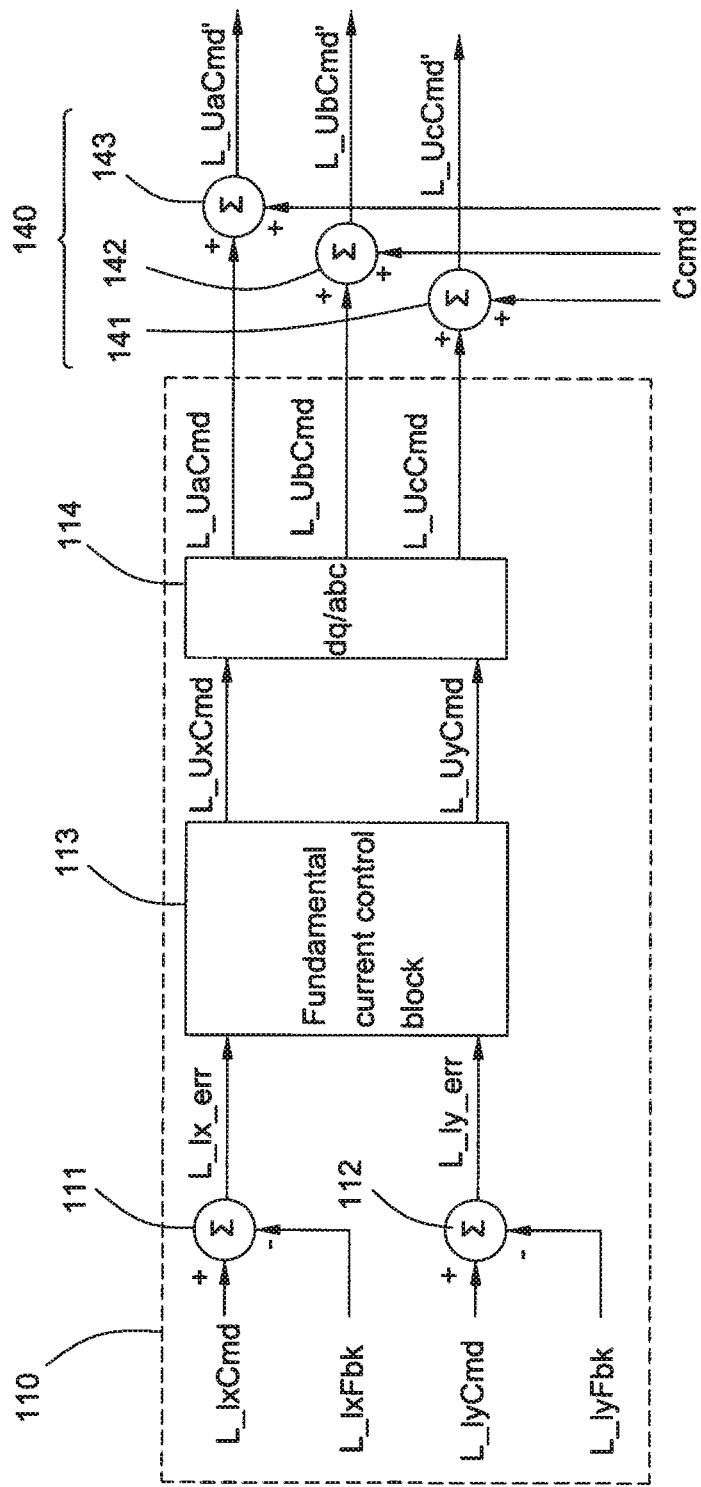
FIG. 5 is a block diagram of an example fundamental control unit for use in the embodiment of FIG. 4.

Referring to FIG. 5, a diagram of the first fundamental control unit 110 in accordance with one embodiment is shown. In this embodiment, the first fundamental control unit 110 includes a first difference element 111, a second difference element 112, a fundamental current control block 113, and a dq/abc transformation block 114. The first difference element 111 is used to obtain an active current error signal L_Ix_err representative of the difference between a real active current command L_IxCmd and a feedback active current signal L_IxFbk in dq coordinates. The second difference element 112 is used to obtain a reactive current error signal L_Iy_err representative of the difference between a real reactive current command L_IyCmd and a feedback reactive current signal L_IyFbk in dq coordinates. It is understood that the feedback active current signal L_IxFbk and the feedback reactive current signal L_IyFbk can be obtained by obtaining current values from current sensors at the output of the power conversion system and, if necessary performing calculations on those current values. In one embodiment, the real active current command L_IxCmd and the real reactive current command L_IyCmd may be pre-programmed.

The fundamental current control block 113 is used to convert the active current error signal L_Ix_err and the reactive current error signal L_Iy_err to a corresponding active command L_Uxcmd and a corresponding reactive command L_Uxcmd. These commands are used to modulate the duty cycle of the PWM signal of the first modulator 210 to control the source-side converter 14 to implement fundamental power conversion without necessarily balancing the neutral point voltage. It is understood that the fundamental current control block 113 can use any appropriate method to implement the above function, such as a proportional integral (PI) regulator or a proportional integral differential (PID) regulator, for example.

For implementing available control, the dq/abc transformation block 114 is used to transform the active command L_Uxcmd and reactive command L_Uxcmd in dq coordinates to corresponding fundamental commands L_UaCmd, L_UbCmd, and L_UcCmd in abc coordinates, as the first fundamental command Fcmd1. In one embodiment, the dq/abc transformation block 114 implements Park's transformation algorithm to transform signals from dq coordinates to abc coordinates. The commands L_UaCmd, L_UbCmd, L_UcCmd (namely the first fundamental command Fcmd1) can directly modulate the duty cycle of the PWM signal of the first modulator 210 to control the source-side converter 14 to implement fundamental power conversion without necessarily balancing the neutral point voltage. For achieving neutral point voltage balance, the summation unit 140 including three summation elements 141, 142, and 143 are further used through the transmission path of the first fundamental command Fcmd1 (L_UaCmd, L_UbCmd, L_UcCmd) respectively to receive the first compensation command Ccmd1 and to modify into modulation commands L_UaCmd', L_UbCmd', L_UcCmd' (namely the first modulation command Mcmd1) so as to achieve neutral point voltage balance. The second fundamental control unit 120 has a similar configuration as the first fundamental control unit 110 and thus the description is not repeated here. In other embodiments, when the first fundamental command Fcmd1 is sent used in dq coordinates, the dq/abc transformation block 114 may be omitted, and the summation unit 140 may be implemented using the dq coordinates.

Figures 6, 7:
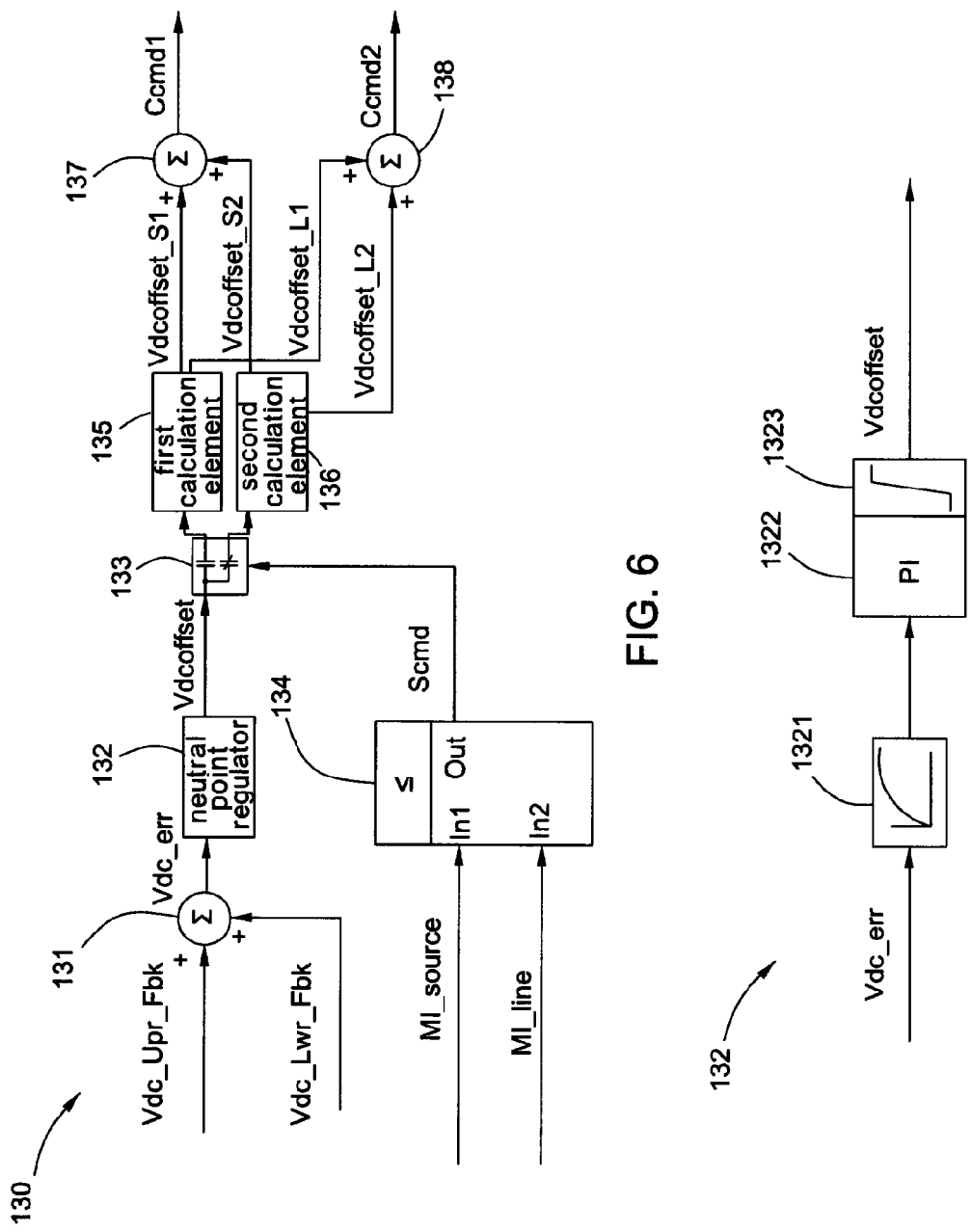
FIG. 6 is a block diagram of an example compensation control unit for use in the embodiment of FIG. 4.
FIG. 7 is a block diagram of an example neutral point voltage regulator for use in the embodiment of FIG. 6.

Referring to FIG. 6, a diagram of the compensation control unit 130 in accordance with one embodiment is shown. In this embodiment, the compensation control unit 130 includes a difference element 131, a neutral point voltage regulator 132, a switch element 133, a comparator 134, a first calculation element 135, a second calculation element 136, a first summation element 137, and a second summation element 138. The difference element 131 is used to obtain a voltage error signal Vdc_err representative of the neutral point voltage imbalance which is calculated from the difference between a feedback voltage signal Vdc_Upr_Fbk on the capacitor C1 and a feedback voltage signal Vdc_Lwr_Fbk on the capacitor C2. The neutral point voltage regulator 132 receives the voltage error signal Vdc_err and produces a fundamental compensation command Vdcoffset (injected DC offset) for driving the voltage error signal Vdc_err towards zero. The switch element 133 is used to output the fundamental compensation command Vdcoffset to one of the first calculation element 135 and the second calculation element 136 according to a switch command Scmd from the output terminal Out of the comparator 134.

Referring to FIG. 7, in one embodiment, the neutral point voltage regulator 132 may include a filter element 1321 and a PI regulator 1322 combined with a limiter 1323. In other embodiments, the neutral point voltage regulator 132 may use other elements and/or algorithms to obtain the fundamental compensation command Vdcoffset.

With continued reference to FIG. 6, the first input terminal In1 of the comparator 134 receives a first modulation index MI_source of the source-side converter 14, and the second input terminal In2 of the comparator 134 receives a second modulation index MI_line of the line-side converter 15. The comparator 134 determines whether the first modulation index MI_source is less than or equal to the second modulation index MI_line. If the first modulation index MI_source is less than or equal to the second modulation index MI_line, the switch command Scmd controls the switch element 133 to output the fundamental compensation command Vdcoffset to the first calculation element 135. If the first modulation index MI_source is greater than the second modulation index MI_line, the switch command Scmd controls the switch element 133 to output the fundamental compensation command Vdcoffset to the second calculation element 136. In other embodiments, if the first modulation index MI_source is equal to the second modulation index MI_line, the switch command Scmd also can alternatively control the switch element 133 to output the fundamental compensation command Vdcoffset to the second calculation element 136. In other embodiments, the comparator 134 may include a hysteresis band for switching the two states, which can make the switch frequency be smoother.

The first calculation element 135 is used to output a first source-side compensation command Vdcoffset_S1 and a first line-side compensation command Vdcoffset_L1 based on the fundamental compensation command Vdcoffset. The second calculation element 136 is used to output a second source-side compensation command Vdcoffset_S2 and a second line-side compensation command Vdcoffset_L2 based on the fundamental compensation command Vdcoffset. When the first calculation element 135 receives the fundamental compensation command Vdcoffset, the first source-side compensation command Vdcoffset_S1 acts as the first compensation command Ccmd1 through the first summation element 137, and the first line-side compensation command Vdcoffset_L1 acts as the second compensation command Ccmd2 through the second summation element 138. When the second calculation element 136 receives the fundamental compensation command Vdcoffset, the second source-side compensation command Vdcoffset_S2 acts as the first compensation command Ccmd1 through the first summation element 137, and the second line-side compensation command Vdcoffset_L2 acts as the second compensation command Ccmd2 through the second summation element 138.

When the first calculation element 135 receives the fundamental compensation command Vdcoffset, the first calculation element 135 determines whether the absolute value of the fundamental compensation command Vdcoffset is greater than or equal to a modulation index surplus value $S\_MI_{sp}$ of the source-side converter 14. If the absolute value of the fundamental compensation command Vdcoffset is less than a modulation index surplus value $S\_MI_{sp}$ of the source-side converter 14, the first source-side compensation command Vdcoffset_S1 is equal to the fundamental compensation command Vdcoffset, and the first line-side compensation command Vdcoffset_L1 is equal to zero.

If, however, within first calculation unit 135, the absolute value of the fundamental compensation command Vdcoffset is greater than or equal to the modulation index surplus value $S\_MI_{sp}$ of the source-side converter 14, it is first determined whether the fundamental compensation command Vdcoffset is a positive value. When the fundamental compensation command Vdcoffset is a positive value, the first source-side compensation command Vdcoffset_S1 is equal to the modulation index surplus value $S\_MI_{sp}$, and the first line-side compensation command Vdcoffset_L1 is equal to the difference between the fundamental compensation command Vdcoffset and the modulation index surplus value $S\_MI_{sp}$ (namely Vdcoffset−$S\_MI_{sp}$). In contrast, when the fundamental compensation command Vdcoffset is a negative value, the first source-side compensation command Vdcoffset_S1 is equal to the negative of the modulation index surplus value $S\_MI_{sp}$, and the first line-side compensation command Vdcoffset_L1 is equal to the difference between the fundamental compensation command Vdcoffset and the negative of the modulation index surplus value $S\_MI_{sp}$ (namely Vdcoffset+$S\_MI_{sp}$).

When the second calculation element 136 receives the fundamental compensation command Vdcoffset, the second calculation element 136 determines whether the absolute value of the fundamental compensation command Vdcoffset is greater than or equal to a modulation index surplus value $L\_MI_{sp}$ of the line-side converter 15. If the absolute value of the fundamental compensation command Vdcoffset is less than the modulation index surplus value $L\_MI_{sp}$ of the line-side converter 15, the second line-side compensation command Vdcoffset_L2 is equal to the fundamental compensation command Vdcoffset, and the second source-side compensation command Vdcoffset_S2 is equal to zero.

If, however, within first calculation unit 136, the absolute value of the fundamental compensation command Vdcoffset is greater than or equal to a modulation index surplus value $L\_MI_{sp}$ of the line-side converter 15, it is again first determined whether the fundamental compensation command Vdcoffset is a positive value. When the fundamental compensation command Vdcoffset is a positive value, the second line-side compensation command Vdcoffset_L2 is equal to the modulation index surplus value $L\_MI_{sp}$, and the second source-side compensation command Vdcoffset_S2 is equal to the difference between the fundamental compensation command Vdcoffset and the modulation index surplus value $L\_MI_{sp}$ (namely Vdcoffset−$L\_MI_{sp}$). In contrast, when the fundamental compensation command Vdcoffset is a negative value, the second line-side compensation command Vdcoffset_L2 is equal to the negative of the modulation index surplus value $L\_MI_{sp}$, and the second source-side compensation command Vdcoffset_S2 is equal to the difference between the fundamental compensation command Vdcoffset and the negative of the modulation index surplus value $L\_MI_{sp}$ (namely Vdcoffset+$L\_MI_{sp}$).

Figure 8:
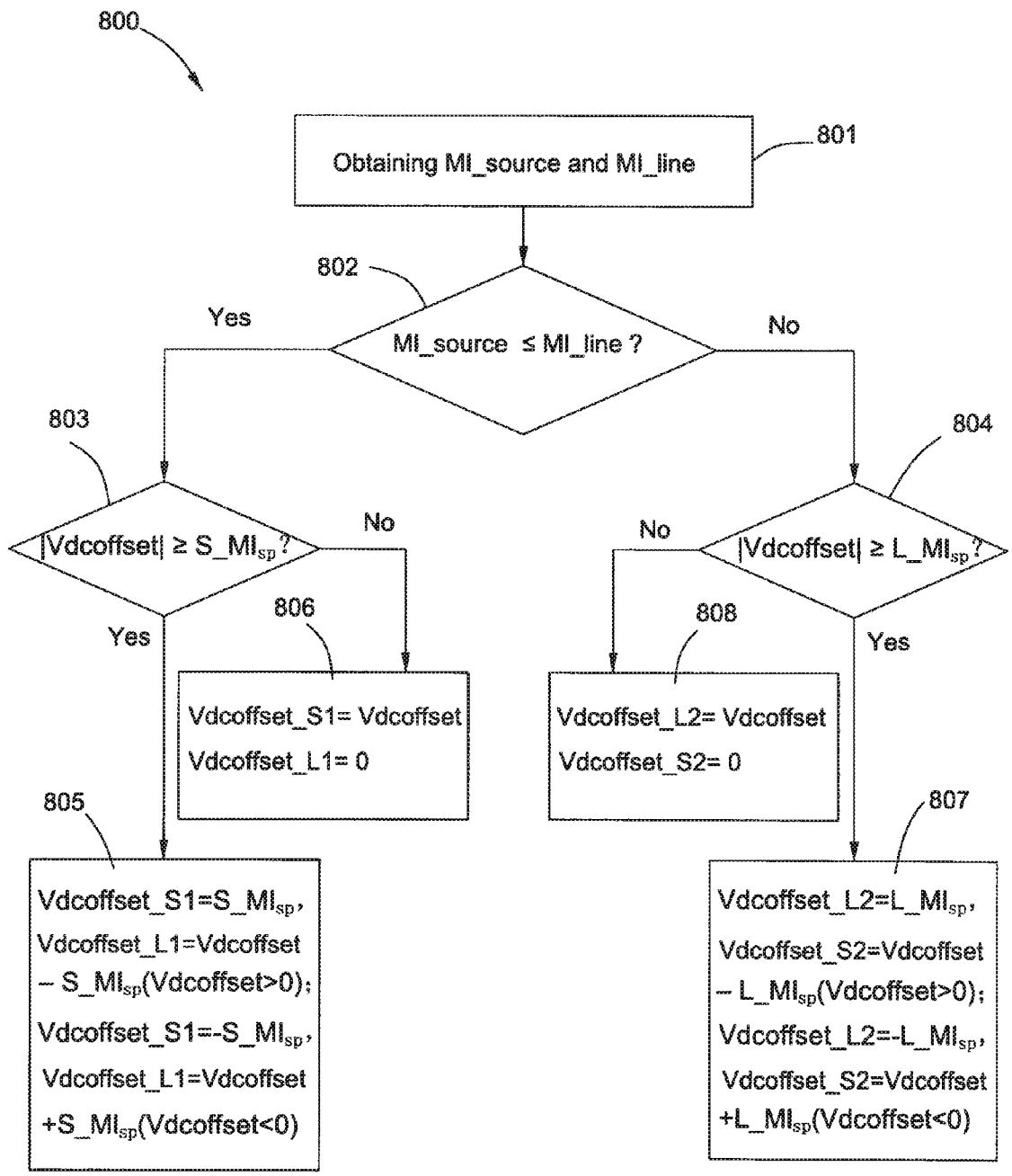
FIG. 8 is a flowchart of a control method in accordance with one embodiment.

Referring to FIG. 8, a flowchart of a control method 800 in accordance with an embodiment corresponding to the compensation control unit 130 of FIG. 6 is shown. The control method 800 may be programmed with software instructions stored in a non-transitory computer-readable medium, which, when executed by a processor, perform various steps of the control method. The computer-readable medium may include volatile and nonvolatile, removable and non-removable media implemented in any method or technology. The computer-readable medium includes, but is not limited to, RAM, ROM, EEPROM, flash memory, digital signal processor (DSP) or other memory technology, CD-ROM, digital versatile disks (DVD) or other optical storage, magnetic cassettes, magnetic tape, magnetic disk storage or other magnetic storage devices, or any other non-transitory medium which can be used to store the desired information and which can be accessed by an instruction execution system.

In one embodiment, the control method 800 may begin at block 801. At block 801, the first modulation index MI_source of the source-side converter 14 and the second modulation index MI_line of the line-side converter 15 are obtained. In one embodiment, the first modulation index MI_source and the second modulation index MI_line may be calculated by conventional methods.

At block 802, the first modulation index MI_source of the source-side converter 14 is compared with the second modulation index MI_line of the line-side converter 15. If the first modulation index MI_source is less than or equal to the second modulation index MI_line, and then the process goes to the block 803. If the first modulation index MI_source is greater than the second modulation index MI_line, and then the process goes to the block 804. In other embodiments, if the first modulation index MI_source is equal to the second modulation index MI_line, the process also can alternatively go to the block 804.

At block 803, the absolute value of the fundamental compensation command Vdcoffset is compared with the modulation index surplus value $S\_MI_{sp}$ of the source-side converter 14. If the absolute value of the fundamental compensation command Vdcoffset is greater than or equal to the modulation index surplus value $S\_MI_{sp}$, and then the process goes to the block 805. If the absolute value of the fundamental compensation command Vdcoffset is less than the modulation index surplus value $S\_MI_{sp}$, and then the process goes to the block 806. In other embodiments, if the absolute value of the fundamental compensation command Vdcoffset is equal to the modulation index surplus value $S\_MI_{sp}$, the process also can alternatively go to the block 806.

At block 804, the absolute value of the fundamental compensation command Vdcoffset is compared with the modulation index surplus value $L\_MI_{sp}$ of the line-side converter 15. If the absolute value of the fundamental compensation command Vdcoffset is greater than or equal to the modulation index surplus value $L\_MI_{sp}$, and then the process goes to the block 807. If the absolute value of the fundamental compensation command Vdcoffset is less than the modulation index surplus value $L\_MI_{sp}$, and then the process goes to the block 808. In other embodiments, if the absolute value of the fundamental compensation command Vdcoffset is equal to the modulation index surplus value $L\_MI_{sp}$, the process also can alternatively go to the block 808.

At block 805, when the fundamental compensation command Vdcoffset is a positive value, the modulation index surplus value $S\_MI_{sp}$ (permissible portion) acts as the first compensation command Ccmd1 used to inject into the first summation unit 140, and the difference between the fundamental compensation command Vdcoffset and the modulation index surplus value $S\_MI_{sp}$ acts as the second compensation command Ccmd2 used to inject into the second summation unit 150. When the fundamental compensation command Vdcoffset is a negative value, the negative of the modulation index surplus value $S\_MI_{sp}$ (permissible portion) acts as the first compensation command Ccmd1 used to inject into the first summation unit 140, and the difference between the fundamental compensation command Vdcoffset and the negative of the modulation index surplus value $S\_MI_{sp}$ acts as the second compensation command Ccmd2 used to inject into the second summation unit 150.

At block 806, the fundamental compensation command Vdcoffset acts as the first compensation command Ccmd1 used to inject into the first summation unit 140, and the second compensation command Ccmd2 is equal to zero.

At block 807, when the fundamental compensation command Vdcoffset is a positive value, the modulation index surplus value $L\_MI_{sp}$ (permissible portion) acts as the second compensation command Ccmd2 used to inject into the second summation unit 150, and the difference between the fundamental compensation command Vdcoffset and the modulation index surplus value $L\_MI_{sp}$ acts as the first compensation command Ccmd1 used to inject into the first summation unit 140. When the fundamental compensation command Vdcoffset is a negative value, the negative of the modulation index surplus value $L\_MI_{sp}$ (permissible portion) acts as the second compensation command Ccmd2 used to inject into the second summation unit 150, and the difference between the fundamental compensation command Vdcoffset and the negative of the modulation index surplus value $L\_MI_{sp}$ acts as the first compensation command Ccmd1 used to inject into the first summation unit 140.

At block 808, the fundamental compensation command Vdcoffset acts as the second compensation command Ccmd2 used to inject into the second summation unit 150, and the first compensation command Ccmd1 is equal to zero.

Figure 9:
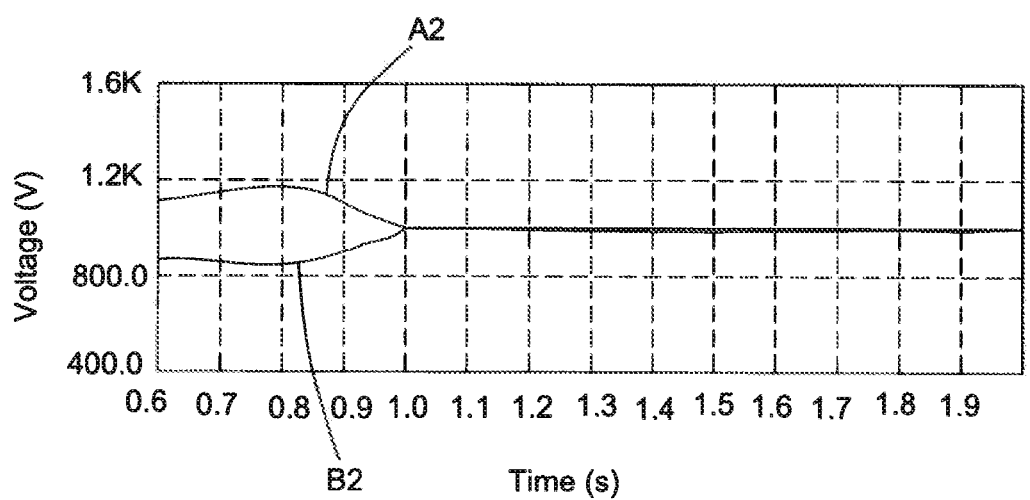
FIG. 9 is a diagram of voltage trends on upper and lower capacitors of the power conversion system of FIG. 2 using the control system of FIG. 4.

Referring to FIG. 9, a simulated diagram of voltage trends on the upper and lower capacitors C1 and C2 of the power conversion system 10 of FIG. 2 using the control method 800 is shown. The voltage trend curves A2 and B2 of the upper capacitor C1 and lower capacitor C2 are converged therebetween gradually, which is good for balancing neutral point voltage.

Although specific features of various embodiments of the invention may be shown in and/or described with respect to some drawings and not in others, this is for convenience only. It is to be understood that the described features, structures, and/or characteristics may be combined in any suitable manner in the various embodiments. Additionally, while the invention has been described with reference to exemplary embodiments, it will be understood by those skilled in the art that various changes may be made and equivalents may be substituted for elements thereof without departing from the scope of the invention. In additional, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A control system for providing commands to a source-side converter and a line-side converter of a power conversion system for balancing a neutral point voltage on a DC link between the source-side converter and the line-side converter, the control system comprising:
    a first fundamental control unit configured to generate a first fundamental command to implement fundamental power conversion operation for the source-side converter;
    a second fundamental control unit configured to generate a second fundamental command to implement fundamental power conversion operation for the line-side converter; and
    a compensation control unit comprising:
        a comparator configured to compare a first modulation index of the source-side converter and a second modulation index of the line-side converter;
        a first calculation element configured to, when the first modulation index is less than the second modulation index, receive a fundamental compensation command and generate a first source-side compensation command for injection into the first fundamental command and, when the first source-side compensation command is not sufficient to balance the neutral point voltage, further generate a first line-side compensating command for injection into the second fundamental command; and
        a second calculation element configured to, when the first modulation index is greater than the second modulation index, receive the fundamental compensation command and generate a second line-side compensation command for injection into the second fundamental command and, when the second line-side compensation command is not sufficient to balance the neutral point voltage, further generate a second source-side compensating command for injection into the first fundamental command.

2. The control system of claim 1, wherein the compensation control unit further comprises a switch element configured to receive the fundamental compensation command and output the fundamental compensation command to one of the first and second calculation elements according to the comparison results of the comparator.

3. The control system of claim 1, further comprising:
a difference element configured to obtain a voltage error signal representative of neutral point voltage imbalance; and
a neutral point voltage regulator configured to receive the voltage error signal and provide the fundamental compensation command for driving the voltage error signal towards zero.

4. The control system of claim 3, wherein the neutral point voltage regulator comprises a filter element and a proportional integral (PI) regulator combined with a limiter.

5. The control system of claim 1, wherein, when the first modulation index is less than the second modulation index, the first calculation element is further configured to:
determine whether the absolute value of the fundamental compensation command is greater than a modulation index surplus value of the source-side converter;
when the absolute value of the fundamental compensation command is greater than a modulation index surplus value of the source-side converter, set the first source-side compensation command to equal the modulation index surplus value if the fundamental compensation command is a positive value, or set the first source-side compensation command to equal the negative of the modulation index surplus value if the fundamental compensation command is a negative value, and set the first line-side compensation command to equal the difference between the fundamental compensation command and the modulation index surplus value if the fundamental compensation command is a positive value, or set the first line-side compensation command to equal the difference between the fundamental compensation command and the negative of the modulation index surplus value if the fundamental compensation command is a negative value; and
when the absolute value of the fundamental compensation command is less than the modulation index surplus value of the source-side converter, set the first source-side compensation command to equal the fundamental compensation command, and set the first line-side compensation command to equal zero.

6. The control system of claim 1, wherein, when the first modulation index is greater than the second modulation index, the first calculation element is further configured to:
determine whether the absolute value of the fundamental compensation command is greater than a modulation index surplus value of the line-side converter;
when the absolute value of the fundamental compensation command is greater than a modulation index surplus value of the line-side converter, set the second line-side compensation command to equal the modulation index surplus value if the fundamental compensation command is a positive value, or set the second line-side compensation command to equal the negative of the modulation index surplus value if the fundamental compensation command is a negative value, and set the second source-side compensation command to equal the difference between the fundamental compensation command and the modulation index surplus value if the fundamental compensation command is a positive value, or set the second source-side compensation command to equal the difference between the fundamental compensation command and the negative of the modulation index surplus value if the fundamental compensation command is a negative value; and
when the absolute value of the fundamental compensation command is less than the modulation index surplus value of the line-side converter, set the second line-side compensation command to equal the fundamental compensation command, and set the second source-side compensation command to equal zero.

7. The control system of claim 1, wherein the first fundamental control unit comprises:
a first difference element configured to obtain an active current error signal;
a second difference element configured to obtain a reactive current error signal;
a fundamental current control block configured to convert the active current error signal and the reactive current error signal to an active command and a reactive command in dq coordinates respectively; and
a dq/abc transformation block configured to transform the active command and the reactive command in dq coordinates to the first fundamental command in abc coordinates.

8. The control system of claim 1, wherein the second fundamental control unit comprises:
a first difference element configured to obtain an active current error signal;
a second difference element configured to obtain a reactive current error signal;
a fundamental current control block configured to convert the active current error signal and the reactive current error signal to an active command and a reactive command in dq coordinates respectively; and
a dq/abc transformation block configured to transform the active command and the reactive command in dq coordinates to the second fundamental command in abc coordinates.

9. The control system of claim 1, wherein the comparator comprises a hysteresis band configured to compare the first and second modulation indexes.

10. The control system of claim 1, further comprising:
a first summation unit configured to inject the first source-side compensation command or the second source-side compensation command into the first fundamental command; and
a second summation unit configured to inject the first line-side compensation command or the second line-side compensation command into the second fundamental command.

11. A control method for balancing a neutral point voltage between a source-side converter and a line-side converter of a power conversion system, the control method comprising:
generating a first fundamental command to implement fundamental power conversion operation for the source-side converter;
generating a second fundamental command to implement fundamental power conversion operation for the line-side converter;
obtaining a first modulation index of the source-side converter and a second modulation index of the line-side converter;

determining whether the first modulation index is less than the second modulation index;

when the first modulation index is less than the second modulation index, generating a first source-side compensation command for injection into the first fundamental command and, when the first source-side compensation command is not sufficient to balance the neutral point voltage, further generating a first line-side compensating command for injection into the second fundamental command; and when the first modulation index is greater than the second modulation index, generating a second line-side compensation command for injection into the second fundamental command and, when the second line-side compensation command is not sufficient to balance the neutral point voltage, further generating a second source-side compensating command for injection into the first fundamental command.

12. The control method of claim 11, when the first modulation index is less than the second modulation index, further comprising:

determining whether an absolute value of a fundamental compensation command is greater than a modulation index surplus value of the source-side converter;

when the absolute value of the fundamental compensation command is greater than a modulation index surplus value of the source-side converter, setting the first source-side compensation command to equal the modulation index surplus value if the fundamental compensation command is a positive value, or setting the first source-side compensation command to equal the negative of the modulation index surplus value if the fundamental compensation command is a negative value, and setting the first line-side compensation command to equal the difference between the fundamental compensation command and the modulation index surplus value if the fundamental compensation command is a positive value, or setting the first line-side compensation command to equal the difference between the fundamental compensation command and the negative of the modulation index surplus value if the fundamental compensation command is a negative value; and when the absolute value of the fundamental compensation command is less than the modulation index surplus value of the source-side converter, setting the first source-side compensation command to equal the fundamental compensation command, and setting the first line-side compensation command to equal zero.

13. The control method of claim 11, when the first modulation index is greater than the second modulation index, further comprising:

determining whether an absolute value of a fundamental compensation command is greater than a modulation index surplus value of the line-side converter;

when the absolute value of the fundamental compensation command is greater than a modulation index surplus value of the line-side converter, setting the second line-side compensation command to equal the modulation index surplus value if the fundamental compensation command is a positive value, or setting the second line-side compensation command to equal the negative of the modulation index surplus value if the fundamental compensation command is a negative value, and setting the second source-side compensation command to equal the difference between the fundamental compensation command and the modulation index surplus value if the fundamental compensation command is a positive value, or setting the second source-side compensation command to equal the difference between the fundamental compensation command and the negative of the modulation index surplus value if the fundamental compensation command is a negative value; and when the absolute value of the fundamental compensation command is less than the modulation index surplus value of the line-side converter, setting the second line-side compensation command to equal the fundamental compensation command, and setting the second source-side compensation command to equal zero.

14. A power conversion system;
a source-side converter;
a line-side converter;
a DC link coupling the source-side and line-side converters; and
a control system configured to provide commands to the source-side and line-side converters for balancing a neutral point voltage at the DC link, the control system comprising:
a first fundamental control unit configured to generate a first fundamental command to implement fundamental power conversion operation for the source-side converter;
a second fundamental control unit configured to generate a second fundamental command to implement fundamental power conversion operation for the line-side converter; and
a compensation control unit comprising:
a switch element configured to receive a fundamental compensation command used to balance the neutral point voltage; and
a comparator configured to compare a first modulation index of the source-side converter and a second modulation index of the line-side converter and control the switch element to provide the fundamental compensation command for injection into at least the first fundamental command to balance the neutral point voltage if the first modulation index is less than the second modulation index and control the switch element to provide the fundamental compensation command for injection into at least the second fundamental command to balance the neutral point voltage if the first modulation index is greater than the second modulation index.

15. The power conversion system of claim 14, further comprising:
a difference element configured to obtain a voltage error signal representative of neutral point voltage imbalance; and
a neutral point voltage regulator configured to receive the voltage error signal and provide the fundamental compensation command for driving the voltage error signal towards zero.

16. The power conversion system of claim 15, wherein the neutral point voltage regulator comprises a filter element and a proportional integral (PI) regulator combined with a limiter.

17. The power conversion system of claim 14, wherein the first fundamental control unit comprises:
a first difference element configured to obtain an active current error signal;
a second difference element configured to obtain a reactive current error signal;
a fundamental current control block configured to convert the active current error signal and the reactive current error signal to an active command and a reactive command in dq coordinates respectively; and
a dq/abc transformation block configured to transform the active command and the reactive command in dq coordinates to the first fundamental command in abc coordinates.

18. The power conversion system of claim 14, wherein the second fundamental control unit comprises:

a first difference element configured to obtain an active current error signal;

a second difference element configured to obtain a reactive current error signal;

a fundamental current control block configured to convert the active current error signal and the reactive current error signal to an active command and a reactive command in dq coordinates respectively; and a dq/abc transformation block configured to transform the active command and the reactive command in dq coordinates to the second fundamental command in abc coordinates.

19. The power conversion system of claim 14, further comprising:

a first calculation element configured to, when the first modulation index is less than the second modulation index and when injection of a permissible portion of the fundamental compensation command into the first fundamental command is not sufficient to balance the neutral point voltage, further generate a line-side compensating command for injection into the second fundamental command; and a second calculation element configured to, when the first modulation index is greater than the second modulation index and when injection of the permissible portion of the fundamental compensation command into the second fundamental command is not sufficient to balance the neutral point voltage, further generate a source-side compensating command for injection into the first fundamental command.

20. The power conversion system of claim 14, wherein the comparator comprises a hysteresis band configured to compare the first and second modulation indexes.

\* \* \* \* \*